June 6, 1950 V. FRECCIA 2,510,879

ELECTROMAGNETIC EXPANSION AND COMPRESSION CIRCUIT FOR SOUND TRANSDUCERS

Filed Dec. 28, 1946

INVENTOR
VIERI FRECCIA
BY [signature]
ATTORNEY

Patented June 6, 1950

2,510,879

UNITED STATES PATENT OFFICE 2,510,879

ELECTROMAGNETIC EXPANSION AND COMPRESSION CIRCUIT FOR SOUND TRANSDUCERS

Vieri Freccia, Venice, Italy

Application December 28, 1946, Serial No. 719,020
In Italy January 5, 1946

7 Claims. (Cl. 179—100.4)

Figure 1:
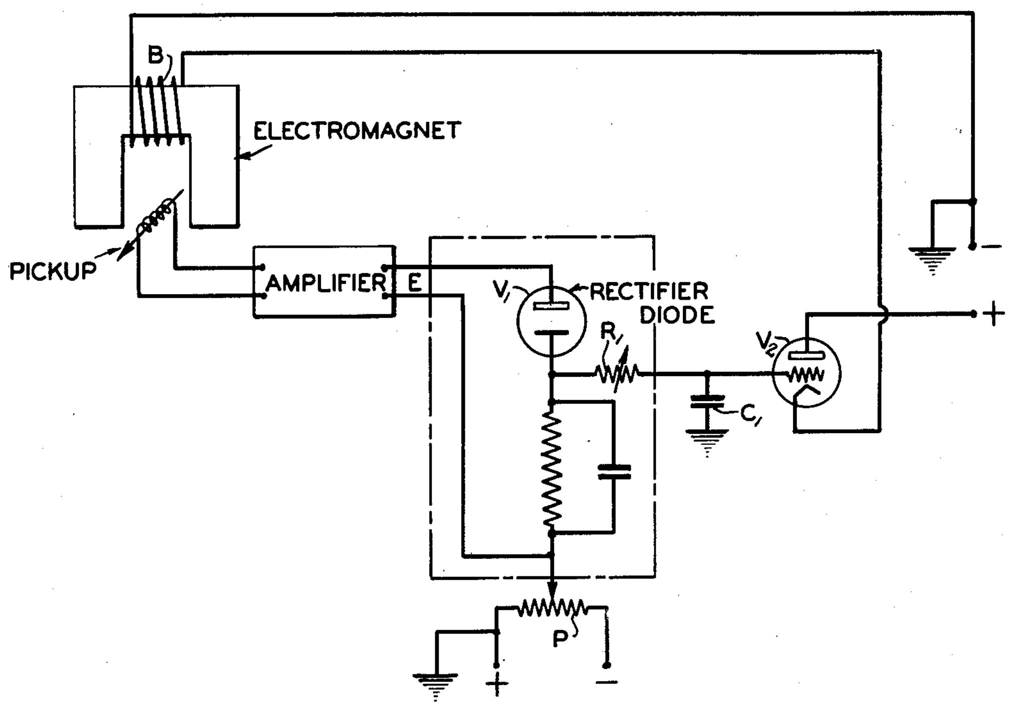

This invention relates to apparatus for recording, reproducing or transmitting sound signals and more particularly to so-called sound compression and expansion arrangements for use therein.

The usual sound recording, transmitting or like systems employ piezo-electric crystal, condenser, electrodynamic or other suitable microphones or pick-up devices by which sound signals are passed to the record cutting head of a recorder or to the modulation amplifier of a radio transmitter (as the case may be) through a channel which in practice almost always includes one or more volume or level controls for controlling the volume to suit the recorder or modulator. Such control commonly called "compression" or "expansion" is necessary in record cutting in order that the amplitude shall not reach a value such as might cause the cutter to cut through into the next groove while it is also necessary in broadcast transmission in order that the modulation amplitude may not be high enough to saturate the final H. F. stages of the transmitter.

Compression is at present usually effected in practice by manual control because known automatic compressors are unsatisfactory as respects introduction of distortion or time-lag or both.

In simple reproduction of sound from a record which has been cut with sound compression, there is obviously a considerable loss of the original dynamic quality of the sound, namely a good deal of the original volume range is lost and accordingly various forms of "expanders" have been proposed for the purpose of restoring the original dynamic qualities.

Known automatic volume or level control systems may be grouped into four classes:

(1) Those which operate by varying the mutual conductance of an electron discharge tube amplifier.

(2) Those which employ a bridge one arm of which is constituted by an electron discharge tube which is controlled by the rectified acoustic signal so as to have its internal impedance varied thereby.

(3) Those which employ bridge arrangements whose parameters vary with signal strength.

(4) Those which operate by varying the mutual inductance or internal resistance of a tube which is controlled by a pilot signal.

In systems falling within the first and last of these classes the amplification factor of one of the first stages of the low frequency amplifier is usually controlled and although these are among the systems most commonly adopted, they have the defect of introducing distortion and requiring fine adjustment. Systems in the other two classes cause excessive attenuation of the signal, and also, especially the bridge methods, are apt to produce distortion with variation of load of the final valves.

According to this invention level or volume control whether compression or expansion is achieved outside the electrical circuit altogether by varying the exciting magnetic field (which in a known arrangement would be a constant field usually supplied by a permanent magnet) in an electrodynamic or electro-magnetic electro-mechanical acoustic translating device (such as an electrodynamic microphone or electromagnetic or electrodynamic recording head). In accordance with the invention the normal permanent magnet in the said translating device is replaced by an electromagnet excited by current which varies in dependence on the intensity of the acoustic signal to be transmitted or reproduced.

The variations of this exciting current should be inversely proportionate to those of the acoustic signal to be recorded or passed to a high frequency modulator (as the case may be) when compression of the acoustic signal is required but should be directly proportionate to those of the signal when it is for example required to reproduce from a record cut with a compression.

The invention will be herein described in more detail for the case of the expansion of sound to be reproduced from a record, in which case the following important advantages are obtained as compared with known systems of expansion:

(1) The low frequency amplifier is not controlled or tampered with in any way.

(2) The low frequency amplifier works at its full potential.

(3) Good reproduction is obtainable with an electromagnetic loud speaker.

(4) It is possible to modify the performance characteristic of the loud speaker and possibly the amplifier without introducing attenuation producing filters into the acoustic channel.

(5) It is possible to vary at will the time-lag in the level control effect whenever necessary down to very small times.

In this particular case, the electromagnet of the pick-up is inserted in accordance with the invention in the circuit of an electron discharge tube whose negative grid voltage is kept at a level such as to allow the passage of a weak current. The detected low frequency signal is amplified by the usual amplifier and then rectified and applied in the positive direction to the grid of the tube in whose circuit the electromagnet is inserted. The positive voltages thus applied to the grid vary with variations of the detected signal so that the tube and electromagnet pass currents which vary proportionately to the signal amplitude. The magnetic flux between the poles of the pick-up increase with increase of the primary current, giving effective expansion of the low frequency signal.

Figure 2:
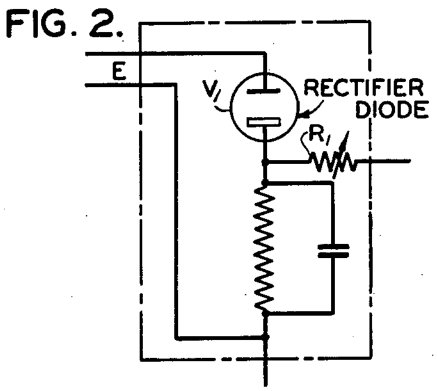

The invention is illustrated in the accompanying drawings, wherein Fig. 1 is a wiring diagram in accordance with one embodiment of the invention; and Fig. 2 is a fragmentary wiring diagram showing a modification within the portion of the diagram of Fig. 1 surrounded by a broken-line-frame.

Referring to Figure 1, which shows an arrangement as just described, the pick-up output, after amplification, is fed at E to a rectifying diode $V_1$ from which it is applied in the positive sense to the grid of a triode $V_2$. The variable resistance $R_1$ that is connected between the cathode of $V_1$ and the grid of $V_2$ operates in conjunction with capacity $C_1$ as an adjustable filter or time constant device for adjusting the time lag of the control. The potentiometer P controls the negative bias on the grid of $V_2$ and therefore the current (with a given signal strength) through $V_2$ and the primary winding B of the pick-up electromagnet. Thus a minimum pick-up signal is obtained which in practice is kept below the noise or scratching level.

Regulation can be effected by varying the negative voltage on the grid of $V_2$ by varying the position of the tap on the potentiometer up to a limiting value at which maximum current is obtained and the pick-up operates in the same conditions as it would if it were excited by a permanent magnet.

A high or low band-pass filter may, if desired, be inserted in the channel to the rectifier $V_1$ so as to alter the effective characteristic performance curve of the pick-up or amplifier in a desired manner.

Figure 2 is a diagram similar to Figure 1 for effecting compression of an acoustic signal in recording. This arrangement in which the corresponding parts are indicated by the same references as in Figure 1, differs from Figure 1 only in the fact that the signal provided by the rectifier $V_1$ is negative so that increase in the potential on the grid of the triode $V_2$ produces a proportionate diminution of current in the cathode-anode circuit thereof.

The invention is not limited to the two circuits shown and described but can be embodied in numerous other circuit arrangements, within the scope of the invention.

Having now particularly described and ascertained the nature of my said invention and in what manner the same is to be performed, I declare that what I claim is:

1. An apparatus for the conversion of mechanical vibrations into electrical oscillations and conversely, comprising in combination: an electromagnet including a winding; a coil device arranged for motion in the field of said electromagnet; a vacuum tube including a cathode, a grid and an anode; said winding being connected to said cathode and said anode; means connected to said coil device for rectifying at least part of the current flowing therein; and an adjustable current lag control device connected between said rectifying means and said grid.

2. An apparatus for the conversion of mechanical vibrations into electrical oscillations and conversely, comprising in combination: an electromagnet including a winding; a coil device arranged for motion in the field of said electromagnet; a vacuum tube including a cathode, a grid and an anode; said winding being connected to said cathode and said anode; a diode tube connected to said coil device for rectifying at least part of the current flowing therein; and a current lag control device connected between said diode tube and said grid.

3. An apparatus for the conversion of mechanical vibrations into electrical oscillations and conversely, comprising in combination: an electromagnet including a winding; a coil device arranged for motion in the field of said electromagnet; a vacuum tube including a cathode, a grid and an anode; said winding being connected to said cathode and said anode; a diode tube connected to said coil device and including a cathode and an anode for rectifying at least part of the current flowing in said coil device; and a current lag control device connected between said cathode of said diode and said grid.

4. An apparatus for the conversion of mechanical vibrations into electrical oscillations and conversely, comprising in combination: an electromagnet including a winding; a coil device arranged for motion in the field of said electromagnet; a vacuum tube including a cathode, a grid and an anode; said winding being connected to said cathode and said anode; means connected to said coil device for rectifying at least part of the current flowing therein; and a filter connected between said rectifying means and said grid.

5. An apparatus for the conversion of mechanical vibrations into electrical oscillations and conversely, comprising in combination; an electromagnet including a winding; a coil device arranged for motion in the field of said electromagnet; a vacuum tube including a cathode, a grid and an anode; said winding being connected to said cathode and said anode; means connected to said coil device for rectifying at least part of the current flowing therein; and a filter including a condenser and an adjustable resistance connected between said rectifying means and said grid.

6. An apparatus for the conversion of mechanical vibrations into electrical oscillations and conversely, comprising in combination; an electromagnet including a winding; a coil device arranged for motion in the field of said electromagnet; a vacuum tube including a cathode, a grid and an anode; said winding being connected to said cathode and said anode; a diode tube connected to said coil device and including a cathode and an anode, for rectifying at least part of the current flowing in said coil device; and a filter including a condenser and an adjustable resistance connected between the cathode of said diode and said grid.

7. An apparatus for the conversion of mechanical vibrations into electrical oscillations and conversely, comprising in combination: an electromagnet including a winding; a coil device arranged for motion in the field of said electromagnet; a vacuum tube including a cathode, a grid and an anode; said winding being connected to said cathode and said anode; a diode tube connected to said coil device and including a cathode and an anode, for rectifying at least part of the current flowing in said coil device; a filter including a condenser and an adjustable resistance connected between the cathode of said diode and said grid, and a potentiometer including a tap connected to said cathode of said diode.

VIERI FRECCIA.

REFERENCES CITED

The following references are of record in the file of this patent:

UNITED STATES PATENTS

| Number | Name | Date |
|---|---|---|
| 1,967,125 | Miller | July 17, 1934 |
| 2,042,966 | Roberts | June 2, 1936 |
| 2,404,160 | Boucke | July 16, 1946 |
| 2,408,821 | Stearns | Oct. 8, 1946 |